(12) United States Patent
Maruo et al.

(10) Patent No.: US 9,290,394 B2
(45) Date of Patent: Mar. 22, 2016

(54) METHOD FOR DECOMPOSING ORGANIC COMPOUND CONTAINED IN AQUEOUS SOLUTION

(71) Applicant: PANASONIC CORPORATION, Osaka (JP)

(72) Inventors: Yuko Maruo, Osaka (JP); Daisuke Ino, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 73 days.

(21) Appl. No.: 14/038,690

(22) Filed: Sep. 26, 2013

(65) Prior Publication Data

US 2014/0027387 A1    Jan. 30, 2014

Related U.S. Application Data

(63) Continuation of application No. PCT/JP2012/002959, filed on May 1, 2012.

(30) Foreign Application Priority Data

Jan. 26, 2012 (JP) .................................. 2012-013728
Feb. 28, 2012 (JP) .................................. 2012-041648

(51) Int. Cl.
C02F 1/32 (2006.01)
B01J 37/34 (2006.01)
(Continued)

(52) U.S. Cl.
CPC ................. *C02F 1/32* (2013.01); *B01J 21/063* (2013.01); *B01J 29/084* (2013.01); *B01J 35/00* (2013.01);
(Continued)

(58) Field of Classification Search
CPC ........ C02F 1/5281; C02F 1/5236; C02F 1/72; C02F 2101/106; C02F 2101/203; C02F 2101/206; C02F 2103/365; C02F 1/32; B01J 37/343; B01J 35/00
USPC ......... 210/666, 202, 638, 665, 667, 688, 721, 210/748.01, 748.14, 153, 243
See application file for complete search history.

(56) References Cited

U.S. PATENT DOCUMENTS

| 6,251,264 B1 * | 6/2001 | Tanaka et al. ................ 210/96.1 |
| 6,325,946 B1 * | 12/2001 | Finkeldei et al. ............. 210/759 |
| 7,288,498 B1 * | 10/2007 | Levy ................................. 502/5 |
| 2006/0231472 A1 * | 10/2006 | Umezawa et al. ............ 210/202 |

(Continued)

FOREIGN PATENT DOCUMENTS

| JP | 10-151354 A | 6/1998 |
| JP | 10-249210 A | 9/1998 |
| JP | 11-500660 A | 1/1999 |
| JP | 2000-140634 A | 5/2000 |

(Continued)

OTHER PUBLICATIONS

Yuko Maruo et al., "Development of dispersion type TiO2 Photocatalyst for decomposition of medical drugs in water". 77th annual meeting of the Society of Chemical Engineers, Japan p. 427 Mar. 2012.*
International Search Report issued in International Application No. PCT/JP2012/002959 with Date of mailing Jul. 17, 2012.

*Primary Examiner* — Walter D Griffin
*Assistant Examiner* — Cameron J Allen
(74) *Attorney, Agent, or Firm* — McDermott Will & Emery LLP

(57) ABSTRACT

Provided is a method for decomposing at least one of organic compound contained in an aqueous solution by using a titanium dioxide photocatalyst that is excellent in both photocatalytic activity and solid-liquid separation performance for water treatment. The method includes: a step of adding catalyst particles into the aqueous solution; a step of decomposing the organic compound by irradiating the aqueous solution with light having a wavelength of 200 nanometers or more and 400 nanometers or less while stirring the catalyst particles in the aqueous solution; and a step of stopping the stirring, and separating the catalyst particles from the aqueous solution by sedimentation. The catalyst particles are composed only of titanium dioxide particles and zeolite particles, the titanium dioxide particles are adsorbed on outer surfaces of the zeolite particles, the zeolite particles have a silica/alumina molar ratio of 10 or more, and the catalyst particles are contained in the aqueous solution at a concentration of 0.4 grams/liter or more and 16 grams/liter or less.

5 Claims, 7 Drawing Sheets

(51) Int. Cl.
*B01J 21/06* (2006.01)
*B01J 29/08* (2006.01)
*B01J 35/00* (2006.01)
*B01J 35/02* (2006.01)
*B01J 37/02* (2006.01)

(52) U.S. Cl.
CPC .............. *B01J 35/004* (2013.01); *B01J 35/023* (2013.01); *B01J 37/0221* (2013.01); *B01J 37/343* (2013.01); *C02F 2305/10* (2013.01); *C02F 2305/12* (2013.01); *Y02W 10/37* (2015.05)

(56) References Cited

U.S. PATENT DOCUMENTS

2007/0119762 A1* 5/2007 Shao et al. .................. 210/198.1
2012/0261347 A1* 10/2012 Hassler et al. ................ 210/683

FOREIGN PATENT DOCUMENTS

| JP | 2002119980 A | * | 4/2002 |
| JP | 2004-313844 A | | 11/2004 |
| JP | 2011-183352 A | | 9/2011 |
| WO | 96/26903 A1 | | 9/1996 |

* cited by examiner

US 9,290,394 B2

METHOD FOR DECOMPOSING ORGANIC COMPOUND CONTAINED IN AQUEOUS SOLUTION

This application is a Continuation of PCT/JP2012/002959 filed on May 1, 2012, which claims foreign priority of Japanese Patent Application No. 2012-013728 filed on Jan. 26, 2012 and Japanese Patent Application No. 2012-041648 filed on Feb. 28, 2012, the entire contents of which applications are incorporated herein by reference.

TECHNICAL FIELD

The present invention relates to a method for decomposing at least one of organic compound contained in an aqueous solution.

BACKGROUND ART

In recent years, it has been expected to use photocatalyst particles for purifying polluted water and treating water containing organic pollutants. In order to ease solid-liquid separation of the photocatalyst particles dispersed in water, it has been proposed to use a photocatalyst in which titanium dioxide particles are immobilized on support particles having a larger particle diameter with a binder such as a binding agent (see Patent Literature 1, for example). In addition, there has been proposed a technique using a photocatalyst obtained by coating support particles with titanium dioxide by a coating process such as a sol gel process (see Patent Literature 2, for example).

CITATION LIST

Patent Literature

PLT 1: JP 10 (1998)-249210 A
PLT 2: JP 11 (1999)-500660 T

SUMMARY OF INVENTION

Technical Problem

Although the techniques proposed in Patent Literature 1 and Patent Literature 2 are suitable for the solid-liquid separation of the photocatalyst particles dispersed in water, they may be insufficient in terms of photocatalytic activities.

In view of the foregoing, the present invention provides a method for decomposing at least one of organic compound contained in an aqueous solution using a titanium dioxide photocatalyst that is excellent in both photocatalytic activity and solid-liquid separation performance for water treatment.

Solution to Problem

In order to solve the above-mentioned problem, the present invention provides a method for decomposing at least one of organic compound contained in an aqueous solution, including: a step a of adding catalyst particles into the aqueous solution; a step b of decomposing the organic compound by irradiating the aqueous solution with light having a wavelength of 200 nanometers or more and 400 nanometers or less while stirring the catalyst particles in the aqueous solution; and a step c of stopping the stirring in the step b, and separating the catalyst particles from the aqueous solution by sedimentation. The catalyst particles are composed only of titanium dioxide particles and zeolite particles. The titanium dioxide particles are adsorbed on outer surfaces of the zeolite particles. The zeolite particles have a silica/alumina molar ratio of 10 or more. The catalyst particles are contained in the aqueous solution at a concentration of 0.4 grams/liter or more and 16 grams/liter or less.

Advantageous Effects of Invention

As described above, it is possible to provide a method for decomposing at least one of organic compound contained in water using a titanium dioxide photocatalyst that is excellent in both photocatalytic activity and solid-liquid separation performance for water treatment.

The "photograph of an electron microscope image" in "BRIEF DESCRIPTION OF DRAWINGS" below should be understood as an "electron microscope image".

DESCRIPTION OF EMBODIMENTS

Figure 1A:
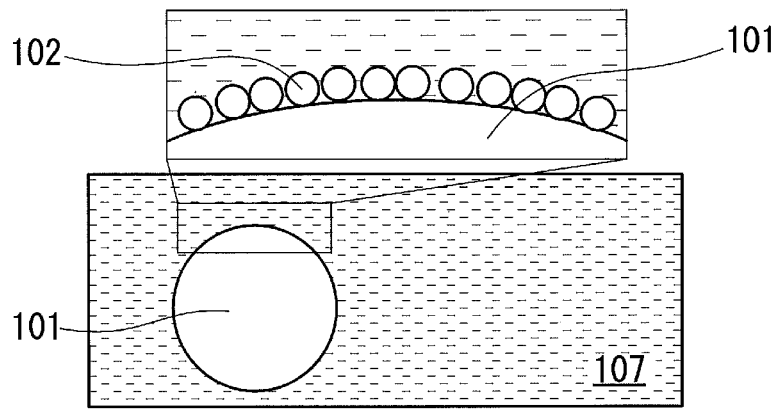
FIG. 1A is a diagram illustrating schematically the structure of a titanium dioxide composite catalyst.

Firstly, the findings that the present invention is based on are described below.

(Findings that the Resent Invention is Based on)

In recent years, there has been an increasing concern about surrounding water environments such as inland rivers and lakes, and the preservation of the overall water environments including aquatic lives inhabiting in these water environments is drawing attention. On the other hand, through agriculture, industry and daily lives of people, pollution problems caused by organic compounds, such as drugs, discharged in the water environments have become evident. The organic compounds such as drugs are highly toxic to the ecosystem in the water environments. However, since the organic compounds such as drugs are usually insoluble and hardly degradable in water, they cannot be removed by conventional sewage treatment technologies, such as an activated sludge process and an adsorption process, typified by a biological treatment. For example, actual data show that the ratios of diclofenac (CAS No. 15307-86-5) and carbamazepine (CAS No. 298-46-4), which are typical substances among the drugs that are organic compounds, removed by an activated sludge process and an adsorption process are only between about 5% to 50% even when the processing time is extended twice or more than before. The drugs that are organic compounds failing to be removed at a sewage disposal plant have been released into rivers, etc. and accumulated gradually in nature. Actually, innumerable drugs are detected easily in an actual investigation on the presence of drugs in inland rivers, lakes, etc. Moreover, hermaphrodite fishes have been found recently in a specific area, and pollution problems that used to be potentially present in water environments have been emerging.

As water treatment technologies to decompose and remove such residual drugs, an ozonation treatment and a hydrogen peroxide treatment, and furthermore advanced oxidation treatment technologies typified by a photocatalytic treatment have been under development. Among them, a water treatment method using a titanium dioxide photocatalyst is expected to present excellent characteristics in decomposing drugs that are organic compounds contained in water. The excellent characteristics derive largely from OH radicals that are generated from water through a photocatalytic reaction of the titanium dioxide and that are a very active short-life chemical species. The OH radicals generated on the surface of the titanium dioxide make immediately, within their lifetime, a chemical reaction with the drugs that are organic compounds in water. As a result, the drugs are decomposed and removed easily.

In the water treatment method using a titanium dioxide photocatalyst, as the types of the titanium dioxide photocatalyst in a photoreaction reactor, there can be mentioned: (I) immobilized catalyst in which nanometer-order titanium dioxide particles are immobilized on a substrate with a binder or the like; and (II) dispersed catalyst used in a form of a suspension obtained by mixing nanometer-order titanium dioxide particles with water to be treated. The both types of titanium dioxide photocatalysts are irradiated with UV (ultraviolet) light, which is excitation light for titanium dioxide, in a state in which an interface is formed between the titanium dioxide photocatalysts and water. Considering from the viewpoint of efficiency in decomposing a chemical substance, the item (II), dispersed catalyst, is more highly advantageous because of the facts that it can obtain a larger surface area per unit mass and allows the chemical substance to be dispersed without any difficulties to reach the surface of the titanium dioxide. Actually, a performance comparison between the items (I) and (II) in terms of the efficiency in decomposing a chemical substance in water reveals that the item (II), dispersed catalyst, exhibits 10 to 100 times higher performance than that of the item (I), immobilized catalyst.

However, in the water treatment method using the dispersed catalyst, the titanium dioxide particles are present dispersed in water after the chemical substance is decomposed by the irradiation with UV light. Separating the titanium dioxide particles dispersed in water from the water to be treated by solid-liquid separation makes it possible to reuse the titanium dioxide particles and discharge the treated water. However, the titanium dioxide particles have a nanometer-order particle diameter, and it is difficult to perform the solid-liquid separation of the titanium dioxide particles dispersed in water. For example, in the case of using a separating mechanism with a high polymer filter, the filter is clogged with the titanium dioxide particles and the flow rate of the treated water is lowered, making it difficult to perform continuously the solid-liquid separation of the titanium dioxide particles. In the case of adopting a natural sedimentation method by gravity, the sedimentation velocity of the titanium dioxide particles is extremely low because the titanium dioxide particles have a very small particle diameter, and thus the solid-liquid separation of the titanium dioxide particles fails even when the treated water in which the titanium dioxide particles are dispersed is settled for one to two days. That is, the water treatment method using the dispersed catalyst exhibits excellent performance in decomposing a chemical substance, but the solid-liquid separation process of the titanium dioxide particles makes the rate-determining step in the entire water treatment in the method, hindering significantly the efficiency of the water treatment. Thus, this method has failed to be put to fully practical use.

When titanium dioxide particles having a diameter larger than that of nanometer level, for example having a diameter larger than 1 μm, are used as a catalyst, they can be subjected to solid-liquid separation by sedimentation. However, titanium dioxide particles with a larger particle diameter have a smaller surface area per unit mass than that of nanometer-order titanium dioxide particles. Moreover, having a larger particle diameter, the titanium dioxide makes a phase transition from an anatase crystal having high photocatalytic activity to a rutile crystal having low photocatalytic activity, failing to achieve sufficient photocatalytic activity. In order to obtain a titanium dioxide particles photocatalyst that allows the titanium dioxide particles dispersed in water to be subjected to solid-liquid separation, the techniques described in Patent Literature 1 and Patent Literature 2 are proposed, for example.

When titanium dioxide particles serving as a photocatalyst are immobilized, with a binder, on support particles having a larger particle diameter than that of the titanium dioxide particles, the titanium dioxide particles are immobilized firmly on the surfaces of the support particles. As a result, micrometer-order photocatalyst particles suitable for solid-liquid separation of the photocatalyst particles dispersed in water can be obtained. However, the immobilization in this way may inactivate the photocatalytic activity of the titanium dioxide particles. Also, a photocatalyst in which titanium dioxide are deposited on support particles by a sol gel process is suitable for solid-liquid separation of the photocatalyst particles dispersed in water but has insufficient photocatalytic activity, similarly to the photocatalyst in which titanium dioxide particles are immobilized, with a binder, on support particles having a larger particle diameter than that of the titanium dioxide particles.

In view of the above findings, the present invention is intended to provide a method for decomposing at least one of organic compound contained in an aqueous solution using a titanium dioxide photocatalyst that is excellent in both photocatalytic activity and solid-liquid separation performance for water treatment.

(Outline of an Aspect of the Present Invention)

A first aspect of the present invention is a method for decomposing at least one of organic compound contained in an aqueous solution, including: a step a of adding catalyst particles into the aqueous solution; a step b of decomposing the organic compound by irradiating the aqueous solution with light having a wavelength of 200 nanometers or more and 400 nanometers or less while stirring the catalyst particles in the aqueous solution; and a step c of stopping the stirring in the step b, and separating the catalyst particles from the aqueous solution by sedimentation. The catalyst particles are composed only of titanium dioxide particles and zeolite particles. The titanium dioxide particles are adsorbed on outer surfaces of the zeolite particles. The zeolite particles have a silica/alumina molar ratio of 10 or more. The catalyst particles are contained in the aqueous solution at a concentration of 0.4 grams/liter or more and 16 grams/liter or less.

According to the above aspect, since the catalyst particles are composed only of titanium dioxide particles and zeolite particles and the titanium dioxide particles are adsorbed on the outer surfaces of the zeolite particles, almost all of the surface activity sites that the titanium dioxide particles have can be used effectively. Moreover, the catalyst particles have higher terminal velocity in natural sedimentation than those of zeolite particles alone and titanium dioxide particles alone and also exhibit excellent solid-liquid separation performance.

A second aspect of the present invention is an aspect according to the first aspect, including a step d of adding again the catalyst particles separated by sedimentation in the step c into the aqueous solution after the step c. The step b and the step c are performed again after the step d.

The second aspect makes it possible to reuse the separated catalyst particles.

A third aspect of the present invention is an aspect according to the first aspect, wherein the catalyst particles are separated by sedimentation in a solid-liquid separation vessel having a filtration membrane in the step c, the method further comprises a step e of producing treated water from the aqueous solution using the filtration membrane, and in the step e, the filtration membrane is a filtration membrane obtained by adhering a filter paper made of a resin to each of both sides of a plate-like frame, and the filtration membrane is arranged parallel to a direction in which the catalyst particles sediment.

The third aspect makes it possible to produce treated water using the filtration membrane.

A fourth aspect of the present invention is an aspect according to the third aspect, including a step f of adding again the catalyst particles separated by sedimentation in the step c into the aqueous solution after the step c. The step b, the step c and the step e are performed again after the step f.

The fourth aspect makes it possible to reuse the separated catalyst particles in the third aspect.

A fifth aspect of the present invention is an aspect according to the first aspect, wherein the zeolite particles are zeolite particles treated with an acid aqueous solution to dissolve alumina portions thereof to introduce active sites for adsorbing the titanium dioxide particles directly on the zeolite particles, and then washed with water to remove the acid aqueous solution adhered to surfaces of the zeolite particles.

The fifth aspect allows the alumina portions (Al portions) of the zeolite to be dissolved, making it possible to introduce a larger amount of active sites for adsorbing titanium dioxide directly into a basic skeleton of the zeolite.

DESCRIPTION OF EMBODIMENTS

Embodiments of the present invention are described with reference to the drawings. However, the present invention is not limited to the following embodiments.

Embodiment 1

Figure 1B:
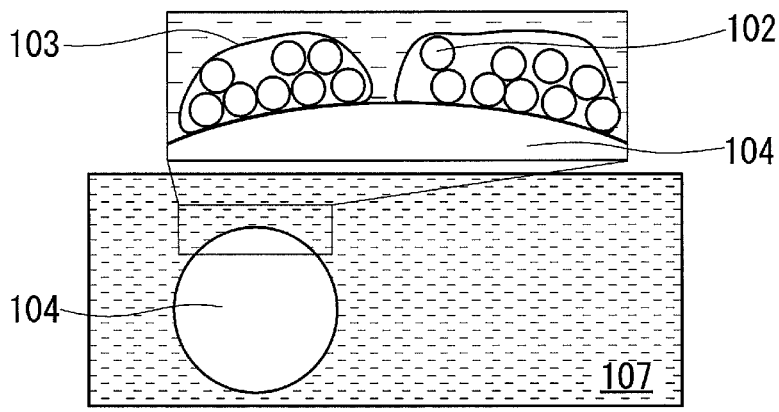
FIG. 1B is a diagram illustrating schematically the structure of a catalyst obtained by a binder process.
Figure 1C:
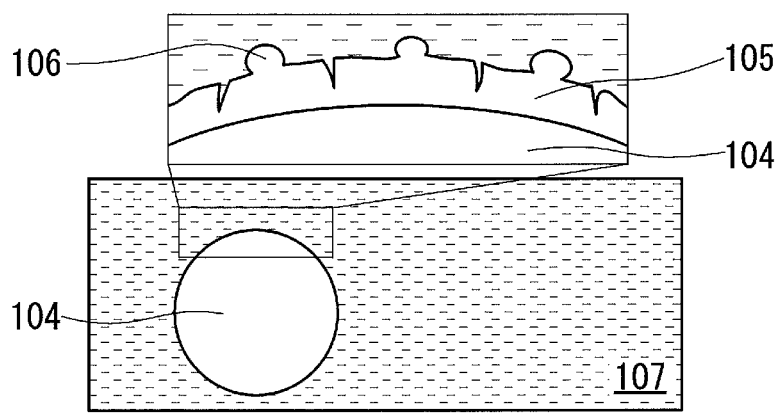
FIG. 1C is a diagram illustrating schematically the structure of a catalyst obtained by a sol gel process.

FIG. 1A illustrates schematically the structure of the titanium dioxide composite catalyst used in the method of the present embodiment. The titanium dioxide composite catalyst of the present embodiment includes a zeolite particle 101 with a micrometer-order particle diameter, and has a structure in which nanometer-order anatase-type titanium dioxide particles 102 are immobilized on the surface of the zeolite particle 101. The titanium dioxide composite catalyst is dispersed in water to be treated 107. That is, the titanium dioxide composite catalyst used in the method of the present embodiment is composed only of the titanium dioxide particles and the zeolite particles. FIG. 1B illustrates schematically the structure of a catalyst in which the titanium dioxide particles are immobilized on a support particle 104 by a binder process that is a conventional technique. FIG. 1C illustrates schematically the structure of a catalyst in which the titanium dioxide particles are immobilized on the support particle 104 by a sol gel process. As shown in FIG. 1B, in the case where the titanium dioxide particles 102 are immobilized on the support particle 104 by using a binder agent thin film 103, a part of surface activity sites peculiar to titanium dioxide particles is covered with a thin film of $SiO_2$, $Al_2O_3$ or the like derived from a precursor substance. As a result, the titanium dioxide particles are inactivated and the catalyst performance thereof is deteriorated. In the case where the support particle is coated with titanium dioxide by a sol gel process, the catalyst has a structure in which the surface of the support particle 104 is covered with a $TiO_2$ thin film 105 and a titanium dioxide deposit 106 is generated at part of an outer skin of the $TiO_2$, as shown in FIG. 1C. Thus, the substantial reaction surface area of the titanium dioxide to serve as a catalyst is not increased. As shown in FIG. 1A, in the titanium dioxide composite catalyst used in the method of the present embodiment, the titanium dioxide particles 102 are immobilized directly on the zeolite particle 101 without a thin film. Therefore, in the titanium dioxide composite catalyst used in the method of the present embodiment, almost all of the surface activity sites that titanium dioxide particles have can be used effectively, and photocatalytic activity equivalent to that of nanometer-order titanium dioxide particles can be maintained. As a result, the photocatalytic activity of the titanium dioxide composite catalyst used in the method of the present embodiment is about 8 times higher than that of the photocatalysts produced by the binder process and the sol gel process. Here, the phrase "the titanium dioxide composite catalyst is composed only of the titanium dioxide particles and the zeolite particles" means that as shown in FIG. 1A, the binder agent thin film 103 is not present on the outer surfaces of the zeolite particle 101 and the titanium dioxide particles 102, and the surface of the zeolite particle 101 is not covered with the $TiO_2$ thin film 105.

For example, zeolite particles and titanium dioxide particles are mixed with each other at a specified weight ratio in pure water or water close to pure water, and the mixed solution is immediately subjected to an ultrasonic dispersion process to allow the titanium dioxide particles to be adsorbed on the surfaces of the zeolite particles, so that the titanium dioxide particles are immobilized directly on the surfaces of the zeolite particles. The purpose of the ultrasonic process is to disperse, by force, the titanium dioxide particles condensed intrinsically in water in the unit of hundreds of particles and to make it easy for the titanium dioxide particles to be immobilized on the surfaces of the zeolite particles. As for the ultrasonic dispersion process time, about 1 hour is desirable. Once adsorbed and immobilized on the surfaces of the zeolite particles, the titanium dioxide particles are hardly separated from the surfaces of the zeolite particles owing to the electrostatic attraction between the titanium dioxide particles and the zeolite particles.

Although the above-mentioned synthesis of the titanium dioxide composite catalyst can be performed also in water to be treated containing drugs that are organic compounds, synthesizing the titanium dioxide composite catalyst in advance in pure water or water close to pure water can make a better result of reproducibility. In order to immobilize the titanium dioxide particles on the surfaces of the zeolite particles, it is desirable that the zeolite particles are subjected to an activation treatment in an acid aqueous solution in advance when the zeolite particles and the titanium dioxide particles are mixed with each other. Zeolite contains silica and alumina as a basic skeleton. From another viewpoint, it can also be said that zeolite contains $(SiO_4)^{4-}$ and $(AlO_4)^{5-}$ as a basic unit. The above-mentioned treatment in the acid aqueous solution allows only the alumina portions (Al portions) of zeolite to be dissolved, making it possible to introduce a larger amount of active sites for adsorbing titanium dioxide directly into the basic skeleton of the zeolite. The zeolite particles having these active sites allow a larger amount of titanium dioxide particles to be adsorbed and immobilized on their surfaces. However, the acid solvent reduces the electrostatic attraction between the titanium dioxide and the zeolite particles. Thus, it is desirable to perform the activation treatment of the zeolite particles in the acid aqueous solution prior to the synthesis of the titanium dioxide composite catalyst.

Figure 2:
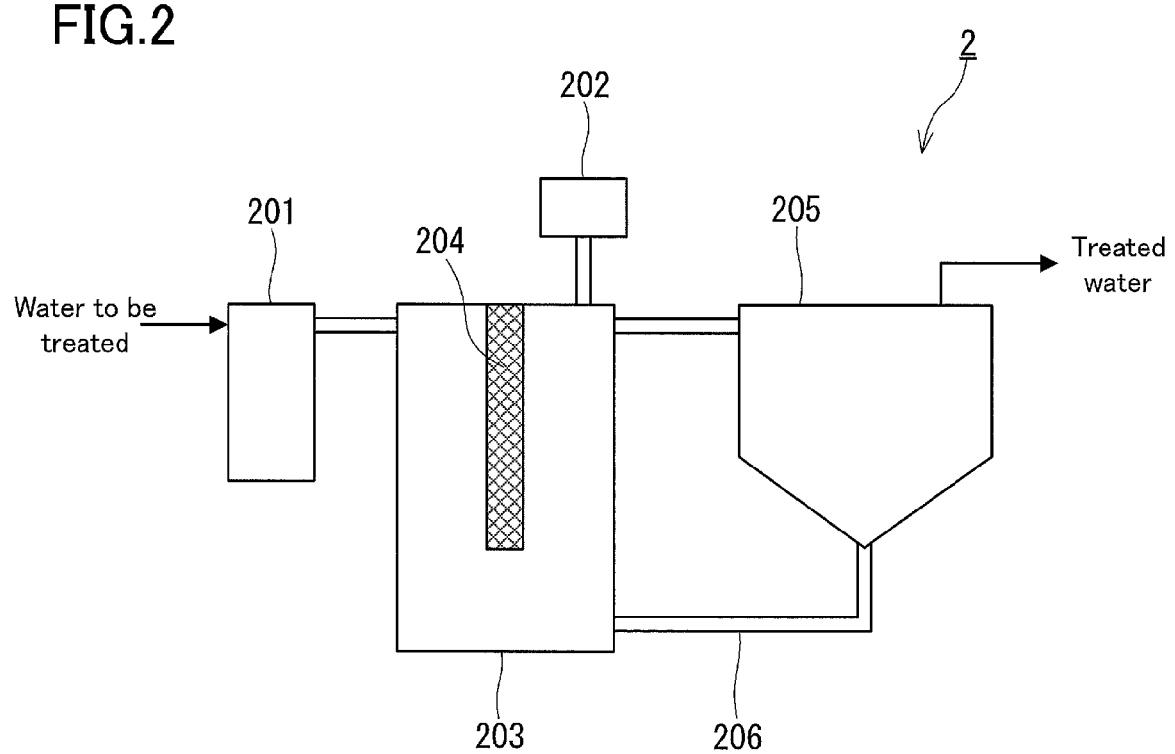
FIG. 2 is a diagram illustrating schematically the configuration of a water treatment system of Embodiment 1.

FIG. 2 shows diagrammatically one embodiment of a water treatment system 2 of the present embodiment. The water treatment system 2 is composed of a pre-filtration vessel 201, a slurry tank 202, a photoreaction reactor 203, a light source 204 provided in the photoreaction reactor 203, a solid-liquid separation vessel 205, and a return part 206. The method of the present embodiment includes a catalyst adding step (step a1), a photoreaction step (step b1) and a sedimentation separation step (step c1), and if needed, a re-adding step (step d1). Hereinafter, each of the steps is described.

<Catalyst Adding Step (Step a1)>

The greatest feature of the method of the present embodiment resides in that the titanium dioxide composite catalyst is irradiated with excitation light in the state in which the titanium dioxide composite catalyst is dispersed uniformly in water to be treated.

A slurry liquid containing the titanium dioxide composite catalyst is supplied from the slurry tank 202. That is, the titanium dioxide composite catalyst is added into the aqueous solution containing drugs that are organic compounds in the photoreaction reactor 203. As a result, the titanium dioxide composite catalyst can be dispersed in the aqueous solution containing drugs that are organic compounds in the photoreaction reactor 203. In order to prevent the titanium dioxide composite catalyst from precipitating, it is desirable to stir lightly the aqueous solution in the photoreaction reactor 203.

Desirably, the titanium dioxide composite catalyst in the photoreaction reactor 203 has an aqueous concentration in the range of 0.4 g/L or more to 16 g/L or less. An aqueous concentration of the titanium dioxide composite catalyst more than 16 g/L disturbs significantly the entry of the aftermentioned UV light and lowers the efficiency in decomposing and removing the drugs that are organic substances. On the other hand, an aqueous concentration of the titanium dioxide composite catalyst less than 0.1 g/L causes the amount of the titanium dioxide composite catalyst to fall short with respect to the amount of the UV light, thereby lowering the efficiency in decomposing and removing the drugs.

<Photoreaction Step (Step b1)>

The UV light is applied from the light source 204. Upon the irradiation with the UV light, the drugs that are organic compounds contained in the aqueous solution are decomposed and removed by the catalytic action of the titanium dioxide composite catalyst. The light from the light source 204 has a wavelength of 200 nm or more and 400 nm or less. The UV light from the light source 204 may be monochromatic light or continuous light as long as it is within this wavelength range. The efficiency in producing OH radicals increases as the light that the titanium dioxide photocatalyst receives has a shorter wavelength. Thus, it is desirable that the light from the light source 204 has a shorter wavelength from the viewpoint of efficiency in decomposing and removing the drugs that are organic compounds contained in the aqueous solution. Examples of the light source that can be used in the photoreaction step include a low pressure mercury lamp, a medium pressure mercury lamp, a high pressure mercury lamp, an excimer lamp, a xenon lamp, sunlight, black light, and LED. It is desirable to stir lightly the aqueous solution in the photoreaction reactor also in this step.

The photoreaction reactor 203 is a batch-type reactor or a continuous-type reactor. Examples of the batch-type reactor include a batch reactor and a batch recirculation reactor. Examples of the continuous-type reactor include a stirred tank reactor and a tubular reactor. When an inorganic compound, such as mud and sand, derived from silicas is contained in the water to be treated, it is desirable to separate and remove the inorganic compound beforehand in the pre-filtration vessel 201.

<Sedimentation Separation Step (Step c1)>

After the photoreaction step, the aqueous solution in which the titanium dioxide composite catalyst is dispersed is transferred from the photoreaction reactor 203 to the solid-liquid separation vessel 205. Thus, the stirring of the aqueous solution in step b1 is stopped. In the solid-liquid separation vessel 205, the titanium dioxide composite catalyst in the aqueous solution is separated from the aqueous solution by sedimentation, producing a concentrate of the titanium dioxide composite catalyst and treated water. Taking advantage of the fact that the titanium dioxide composite catalyst is sedimented easily, the titanium dioxide composite catalyst is separated in the aqueous solution by sedimentation. Examples of the sedimentation separation process include a gravitational sedimentation process, a centrifugal sedimentation process, and a liquid cyclone process.

In the separation by the gravitational sedimentation process, the aqueous solution containing the titanium dioxide composite catalyst is settled in the solid-liquid separation vessel 205. Since the titanium dioxide composite catalyst is sedimented naturally by the action of gravity, a concentrate (slurry liquid) in which the titanium dioxide composite catalyst is concentrated can be obtained at a lower part of the solid-liquid separation vessel 205, and treated water that is a supernatant free from the titanium dioxide composite catalyst can be obtained at an upper part of the solid-liquid separation vessel 205. The settling time is 10 minutes or more, for example. The concentrate (slurry liquid) of the titanium dioxide composite catalyst is returned to the photoreaction reactor 203 through the return part 206 and can be reused in the photoreaction step.

In the separation by the centrifugal sedimentation process, the treated water containing the titanium dioxide composite catalyst is tumbled in a holeless tumbler to separate the titanium dioxide composite catalyst. Only the titanium dioxide composite catalyst moves toward the wall of the reactor by centrifugal force to be concentrated, so that a concentrate of the catalyst and the treated water are separated from each other. The centrifugal force applied on the tumbler is 60 G or more, for example.

<Re-Adding Step (Step d1)>

The concentrate of the titanium dioxide composite catalyst produced in the sedimentation separation step is returned to the photoreaction reactor 203 through the return part 206. That is, the titanium dioxide composite catalyst separated in the sedimentation separation step is added again into the aqueous solution containing drugs that are organic compounds. In order to decompose stably the drugs in the photoreaction reactor 203, it is necessary to add continuously the concentrate of the titanium dioxide composite catalyst into the water to be treated flowing continuously into the photo-reaction reactor through the pre-filtration vessel 201. As the concentrate of the titanium dioxide composite catalyst, the concentrate produced in the solid-liquid separation vessel 205 can be used. That is, the step b1 and the step c1 may be performed after the step d1 in the present embodiment. The titanium dioxide composite catalyst can be reused unless the surface activity sites of the titanium dioxide particles are covered with, for example, scale and/or a hardly decomposable thin film derived from organic or inorganic substances.

<Sedimentation Separation Performance>

In the sedimentation separation step, a performance required for the catalyst particles is to be separated in a short time by a gravitational sedimentation process, for example. This performance can be evaluated by a photo extinction method, for example. The photo extinction method is an evaluation technique to monitor the time-dependent change of light transmittance in a suspension by measuring continuously the transmittance of a laser beam with which the suspension of the catalyst is irradiated. In a suspension of a catalyst with a high sedimentation velocity, a significant transmittance change is observed in a short time because the catalyst is sedimented in a short time. In contrast, in the case of using a substance with a low sedimentation velocity, almost no transmittance change is observed even after a lapse of time.

Figure 3:
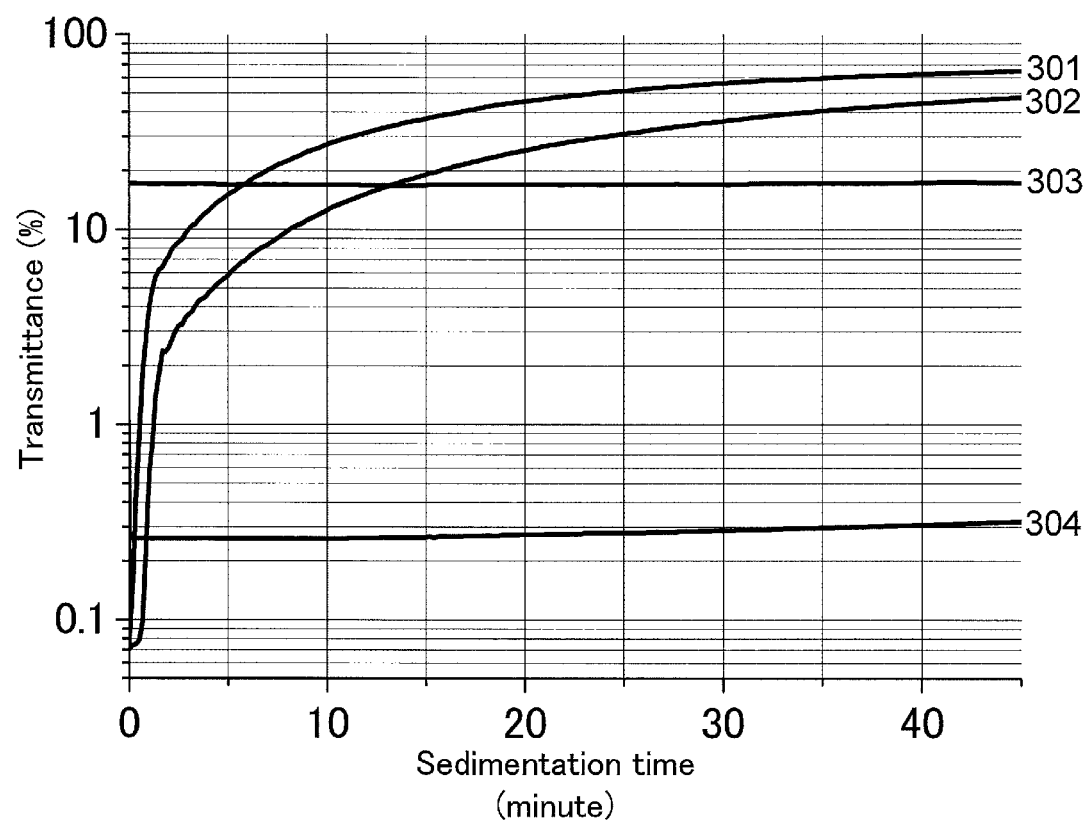
FIG. 3 is a chart showing the results of an evaluation test on natural sedimentation velocity of particles.

To exemplify the excellent sedimentation separation performance of the titanium dioxide composite catalyst particles used in the present embodiment, FIG. 3 shows the states of natural sedimentation of the titanium dioxide composite catalyst particles, titanium dioxide particles (P25 produced by Degussa AG) and zeolite particles (HY type). In FIG. 3, the horizontal axis indicates the time passed since specimen liquids were poured into respective sample cells, and the vertical axis indicates transmittance. The concentration of the titanium dioxide composite catalyst particles in the specimen liquid was 3.6 g/L. The concentration of the titanium dioxide particles in the specimen liquid was 0.9 g/L. The concentration of the zeolite particles in the specimen liquid was 2.7 g/L. The concentration of the titanium dioxide particles and the concentration of the zeolite particles were respectively the same as the concentration of the titanium dioxide particles included in the titanium dioxide composite catalyst particles and the concentration of the zeolite particles included in the titanium dioxide composite catalyst particles. As the titanium dioxide composite catalyst particles, two kinds of catalysts were prepared: a catalyst A containing zeolite particles (with a silica/alumina molar ratio of 30 and a Si/Al molar ratio of 15) immersed in a 0.1 mol/L hydrochloric acid aqueous solution and stirred in an ultrasonic washer for 60 minutes; and a catalyst B containing zeolite particles stirred in an ultrasonic washer for 60 minutes without being immersed in a hydrochloric acid aqueous solution.

In FIG. 3, the reference numeral 301 denotes the result of the catalyst A, the reference numeral 302 denotes the result of the catalyst B, the reference numeral 303 denotes the result of the titanium dioxide particles alone, and the reference numeral 304 denotes the result of the zeolite particles alone. The state of the titanium dioxide composite catalyst being sedimented was observed as the transmittance increased with the elapse of time. In order to compare sedimentation performances, the amount of the transmittance change occurred in each specimen over the sedimentation time of 30 minutes was calculated. The titanium dioxide particles specimen had a transmittance change of 0% and the zeolite particles specimen had a transmittance change of 0.026%, and they had almost no increase in transmittance even after 30 minutes passed since the specimen liquids had been poured into the respective sample cells. It can be said that these particles were hardly sedimented over 30 minutes. In contrast, the catalyst A specimen had a transmittance change of 56% and the catalyst B specimen had a transmittance change of 36%. This suggests that regardless of whether the zeolite particles were subjected to the acid treatment, the catalyst A and the catalyst B can be separated from the aqueous solution by sedimentation in a practical time of about 30 minutes to a degree (transmittance change of 20% or more) that allows the solution to be discharged.

The ratios (sedimentation amounts) of the catalyst particles sedimented over 30 minutes since the specimen liquids was poured into respective sample cells were calculated from the transmittance changes. 92% of the particles was sedimented in the catalyst A specimen, and 86% of the particles was sedimented in the catalyst B specimen. This means that the catalyst A and the catalyst B can be separated by sedimentation in a practical time of about 30 minutes. In contrast, only 1.6% of the particles was sedimented in the zeolite particles specimen, and no particles were sedimented in the titanium dioxide particles specimen.

When spherical particles are sedimented freely in a fluid by the action of gravity, the sedimentation velocity of the spherical particles is proportional to the difference between the specific gravity of the particles and that of water and to the square of the particle diameter of the spherical particles. In the titanium dioxide composite catalyst of the present embodiment, titanium dioxide particles having a specific gravity different from that of water by a value 100 times larger than the difference between the specific gravity of the zeolite particles and that of water are immobilized, at a high density, on the outer surfaces of the zeolite particles having a micrometer-order particle diameter (1 μm to 10 μm, for example). Accordingly, the particle diameter of the titanium dioxide composite catalyst is larger than that of the nanometer-order titanium dioxide particles by about three orders of magnitude, and the difference between the specific gravity of the titanium dioxide composite catalyst and that of water is larger than the difference between the specific gravity of the zeolite particles and that of water by about two orders of magnitude. These are conceived to be two factors that allow the titanium dioxide composite catalyst to exhibit an extremely higher sedimentation velocity than those of the zeolite particles and the titanium dioxide particles.

The zeolite particles used in the present embodiment are a porous inorganic compound containing silica and alumina as a basic skeleton. From another viewpoint, it can also be said that the zeolite particles used in the present embodiment are a porous inorganic compound containing $(SiO_4)^{4-}$ and $(AlO_4)^{5-}$ as a basic unit. The sedimentation performance of the catalyst particles that influences the sedimentation separation step of the present embodiment is affected by the ratio of the silica and alumina composing the zeolite. Here, the molar ratio of the silica/alumina composing the zeolite is two times higher than the ratio of $(SiO_4)^{4-}$ and $(AlO_4)^{5-}$, that is, the Si/Al molar ratio, in the zeolite. The sedimentation performance of the titanium dioxide composite catalyst in the sedimentation separation step of the present embodiment is affected by the ratio of the silica and alumina composing the zeolite. Table 1 shows the transmittance change and the ratio (sedimentation amount) of the catalyst particles sedimented over a sedimentation time of 30 minutes in each of the titanium dioxide composite catalysts synthesized using zeolite particles having different silica/alumina molar ratios.

TABLE 1

| Silica/alumina molar ratio | 5 | 10 | 30 | 60 | 770 |
|---|---|---|---|---|---|
| Si/Al molar ratio | 2.5 | 5 | 15 | 30 | 385 |
| Transmittance change [%] | 1.6 | 20 | 36 | 46 | 61 |
| Sedimentation amount [%] | 43.6 | 80.0 | 85.9 | 88.9 | 93.2 |

As shown in the table, the titanium dioxide composite catalysts with the zeolite particles having a silica/alumina molar ratio of ten or more (a Si/Al molar ratio of five or more) can be sedimented in a practical time of about 30 minutes to a degree (transmittance change of 20% or more) that allows the solution to be discharged. Only in the cases where zeolite particles having a silica/alumina ratio of ten or more is used as a support material, the titanium dioxide particles can be immobilized thereon stably. The reason is because the aftermentioned bond occurs more easily between the titanium dioxide particles and the zeolite. Therefore, the titanium dioxide particles can be used in water for a longer period of time without being desorbed from the zeolite particles. The crystal system of the zeolite particles to serve as a support material is not particularly limited. Zeolite particles, such as common faujasite type and MFI type zeolite particles, can be used, for example.

In the titanium dioxide composite catalyst of the present embodiment, a strong bond derived from electrostatic attraction is present between the titanium dioxide particles and the zeolite particles. Thus, the titanium dioxide composite catalyst of the present embodiment is highly durable, and many of the titanium dioxide particles are still immobilized on the zeolite particles even after the elapse of several months, for example. In contrast, an inorganic material such as silica particles and alumina particles, and an inorganic porous body such as brick and concrete are used as a support material, for example, no strong bond occurs between the support material and the titanium dioxide particles. In such a case, stirring the catalyst together with the aqueous solution in the photoreaction reactor causes many of the titanium dioxide particles to be desorbed from the support material in a short time.

In the present embodiment, the titanium dioxide particles immobilized on the zeolite particles are particles of anatase crystal system having a photocatalyst function, and examples thereof include nanometer-order size titanium dioxide particles such as P25 produced by Degussa AG, Germany. When the titanium dioxide particles have an average particle diameter in the range of 1 nm to 100 nm, a preferable titanium dioxide composite catalyst can be composed. The average particle diameter is defined as an average value of major axes and minor axes of the titanium dioxide particles. When the average particle diameter of the titanium dioxide particles is less than 1 nm, the catalytic activity is lowered due to a quantum size effect. When the average particle diameter of the titanium dioxide particles is more than 100 nm, the gravity acting on the titanium dioxide particles is larger than the force acting between the titanium dioxide particles and the zeolite particles. Thus, the immobilization of the titanium dioxide particles on the zeolite particles becomes unstable, making it easy for the titanium dioxide particles to be desorbed from the zeolite particles. Accordingly, the reproducibility of the titanium dioxide composite catalyst is lowered. The particle size distribution of the titanium dioxide particles composing the titanium dioxide composite catalyst of the present embodiment was measured from a TEM (transmission electron microscope) image. As a result, it was found that the particle size distribution of the titanium dioxide particles of the present embodiment was 25.8±24.6 nm and the particle diameters fell within this range. An error is a standard deviation at 99% confidence limit.

In the method of the present embodiment, the OH radicals generated from the surfaces of the titanium dioxide under the UV light irradiation serves the role of decomposing and removing drugs that are organic compounds. When the chemical substances to be decomposed and removed are organic compounds containing carbon atoms and nitrogen atoms as a skeleton, the OH radicals can exhibit high reactivity. As a result, the organic compounds are decomposed. Since almost all drugs are classified as an aromatic compound or an aliphatic compound, drugs in general can be decomposed and removed by the water treatment method of the present embodiment.

Embodiment 2

The method of Embodiment 2 is described with reference to FIG. 4. Embodiment 2 is the same as Embodiment 1 unless otherwise described in particular below.

Figure 4:
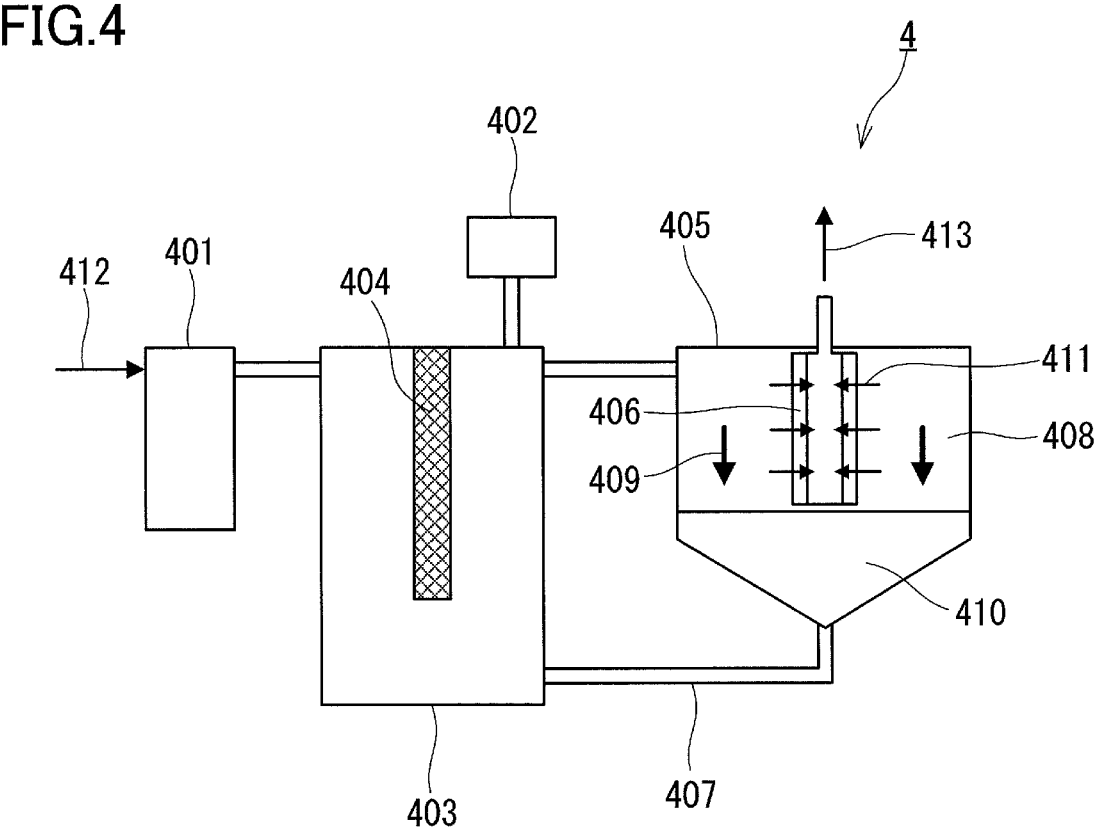
FIG. 4 is a diagram illustrating schematically the configuration of a water treatment system of Embodiment 2.

FIG. 4 illustrates schematically a water treatment system that realizes the method of the present embodiment. The water treatment system 4 of the present embodiment is composed of a pre-filtration vessel 401, a slurry tank 402, a photoreaction reactor 403, a light source 404 provided in the photoreaction reactor 403, a solid-liquid separation vessel 405, a filtration membrane 406 provided in the solid-liquid separation vessel 405, and a return part 407. The method of the present embodiment includes a catalyst adding step (step a2), a photoreaction step (step b2) and a sedimentation separation step (step c2), and if needed, a re-adding step (step f2), and it further includes a filtration step (step e2). Hereinafter, each of the steps is described.

<Catalyst Adding Step (Step a2)>

Since the catalyst adding step (step a2) of the present embodiment is performed in the same manner as the catalyst adding step (step a1) of Embodiment 1, detailed description thereof is omitted.

<Photoreaction Step (Step b2)>

Since the photoreaction step (step b2) of the present embodiment is performed in the same manner as the photoreaction step (step b1) of Embodiment 1, detailed description thereof is omitted.

<Sedimentation Separation Step (Step c2)>

The aqueous solution treated in the step b2 is sent to the solid-liquid separation vessel 405 and settled. Thus, the stirring of the aqueous solution in the step b2 is stopped. The titanium dioxide composite catalyst is sedimented in the settled aqueous solution, and a layer 410 composed of the precipitated titanium dioxide composite catalyst is formed at a lower part of the solid-liquid separation vessel 405. The layer 410 composed of the precipitated titanium dioxide composite catalyst is separated from a mixed solution 408 of water to be treated and the titanium dioxide composite catalyst and becomes a concentrated slurry. The titanium dioxide composite catalyst composing the concentrated slurry contains the titanium dioxide composite catalyst dispersed in the aqueous solution and catalyst particles that have failed to pass through the filtration membrane 406 in the after-mentioned filtration step (step e2). The ratio of the catalyst recovered as the concentrated slurry is 99.99% or more, for example. The performance evaluation and consideration on the sedimentation of the titanium dioxide composite catalyst of the present embodiment are the same as those described in Embodiment 1.

\<Filtration Step (Step e2)\>

While the catalyst particles are being sedimented in the step c2, treated water 413 is produced at the same time from a mixed solution 408 of water to be treated and the catalyst particles by microfiltration using the filtration membrane 406. The concentration of the titanium dioxide composite catalyst remaining in the treated water produced is 10 ppm or less.

Figure 5:
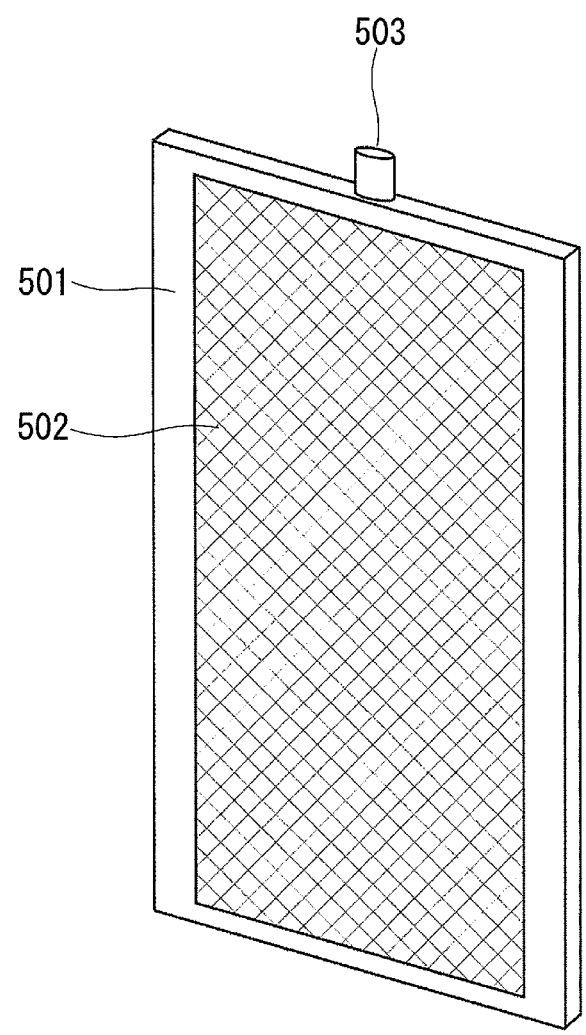
FIG. 5 is a perspective view showing diagrammatically the structure of a filtration membrane.

FIG. 5 is a perspective view showing diagrammatically the structure of the filtration membrane 406. The filtration membrane 406 is obtained by adhering a filter paper 502 made of a synthetic resin to each of both sides of a plate-like frame 501 and fixing it thereon. Water is drawn from a filtration water extraction port 503 with a pump (not shown) to be filtered. The filtration water passes through the filter paper 502 made of a synthetic resin to enter into the frame 501, and comes out from the filtration water extraction port 503 as the treated water 213.

As shown in FIG. 4, the filtration membrane 406 is arranged parallel to a sedimentation direction 409 of the titanium dioxide composite catalyst. Usually, as the filtration proceeds, a sedimentary layer, called a cake layer, composed of the catalyst particles is formed on the surface of the filtration membrane 406. The cake layer falls off from the surface of the filtration membrane 406 due to its own weight and is sedimented at the lower part of the solid-liquid separation vessel 405. The performance evaluation on the microfiltration of the titanium dioxide composite catalyst used in the present embodiment is described later.

\<Re-Adding Step (Step f2)\>

The re-adding step (step f2) of Embodiment 2 is performed in the same manner as the re-adding step (step d1) of Embodiment 1. The concentrated slurry of the titanium dioxide composite catalyst separated in the step c2 is returned to the photoreaction reactor 403 through the return part 407. This means that the titanium dioxide composite catalyst separated in the sedimentation separation step is added again into the aqueous solution containing drugs that are organic compounds. The titanium dioxide composite catalyst particles can be reused repeatedly unless the surface activity sites of the titanium dioxide particles are covered with scale and/or a hardly decomposable thin film derived from organic or inorganic substances. That is, the step b2, the step c2 and the step e2 further may be performed after the step f2 in the present embodiment.

Figure 6:
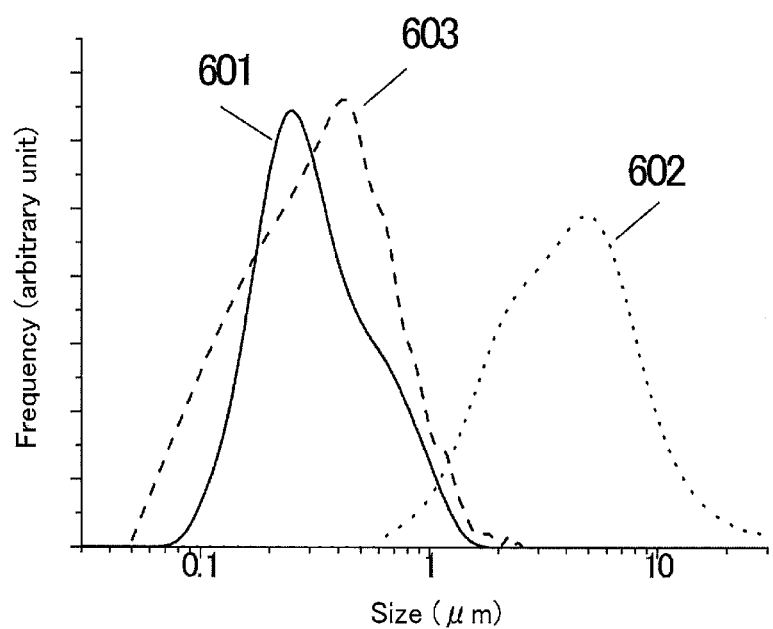
FIG. 6 is a graph showing particle size distributions of titanium dioxide particles and catalyst particles of Embodiment 2.

The performance of the titanium dioxide composite catalyst of the present embodiment in terms of microfiltration is described. In order to separate the titanium dioxide composite catalyst by microfiltration, the titanium dioxide composite catalyst needs to have a sufficiently larger particle diameter than the pore diameter of the filtration membrane. A larger difference between the particle diameter of the titanium dioxide composite catalyst and the pore diameter of the filtration membrane makes it possible to separate the titanium dioxide composite catalyst in a shorter time without clogging the filtration membrane. FIG. 6 shows the results of the particle size distribution measurements on titanium dioxide particles and the titanium dioxide composite catalyst of the present embodiment. The reference numeral 601 denotes the result of the particle size distribution measurement on the titanium dioxide particles. The reference numeral 602 denotes the result of the particle size distribution measurement on the titanium dioxide composite catalyst of the present embodiment. The titanium dioxide composite catalyst has an average particle diameter of 5.5 µm. The resin filtration membrane used for the microfiltration in the filtration step (step f2) has an average pore diameter of 0.42 µm. The titanium dioxide particles have an average particle diameter of 0.2 µm.

EXAMPLES

Hereinafter, examples of the present invention are described in further detail.

Example 1

Figure 7A:
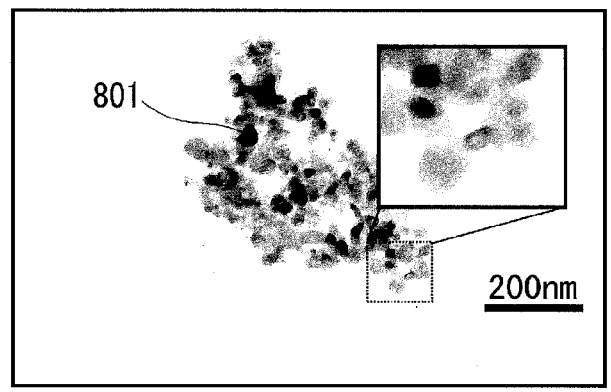
FIG. 7A is a photograph of a transmission electron microscope image of the titanium dioxide particles alone.
Figure 7B:
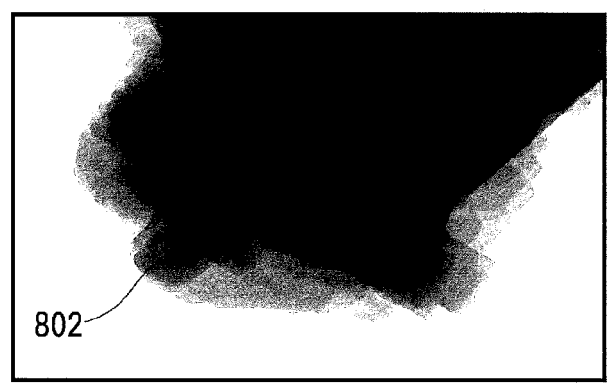
FIG. 7B is a photograph of a transmission electron microscope image of zeolite particles alone.
Figure 7C:
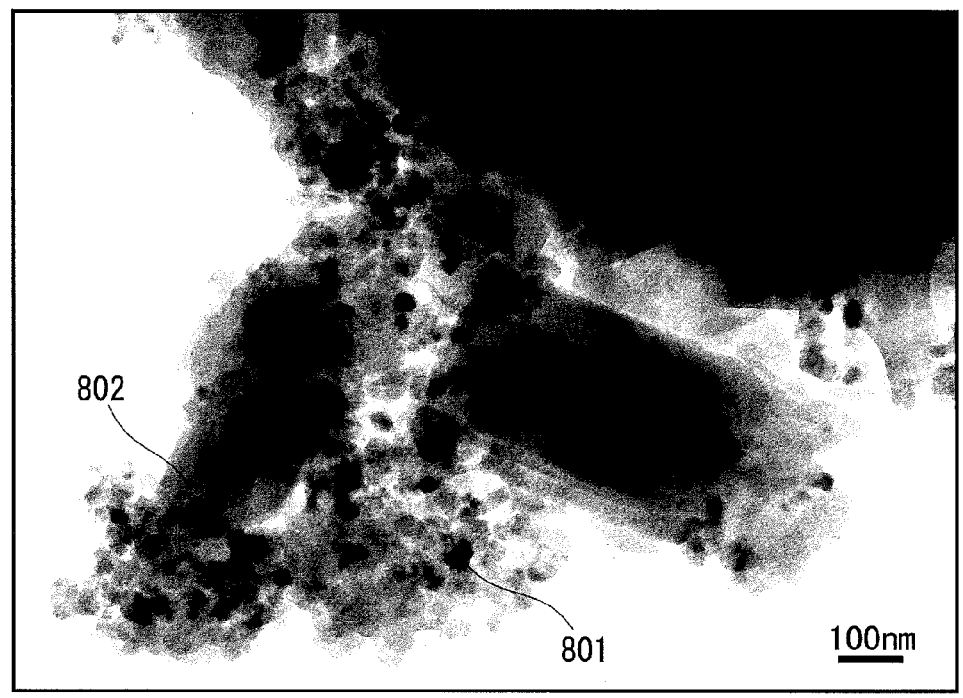
FIG. 7C is a photograph of a transmission electron microscope image of the titanium dioxide composite catalyst according to the present invention.

First, the titanium dioxide composite catalyst was produced by the following technique. As the zeolite particles, HY type zeolite particles (faujasite type zeolite particles produced by Zeolyst) having an average particle diameter of 5.0 µm and a silica/alumina molar ratio of 30 (a Si/aluminum molar ratio of 15) were used. The zeolite particles were immersed in a 0.1 mol/L hydrochloric acid aqueous solution and stirred in an ultrasonic washer for 60 minutes, and then only the zeolite particles were separated and recovered from the water by suction filtration. The resulted powder was rinsed well with water 3 times to wash off acid and it was dried. 0.9 g/L of titanium dioxide particles (P25 produced by Degussa AG) and 2.7 g/L of the HY type zeolite particles treated with the hydrochloric acid aqueous solution were added into pure water produced by an ultrapure water production apparatus. This solution was subjected to an ultrasonic treatment using an ultrasonic generator for 1 hour. Thereafter, the solution was stirred for 60 minutes with a magnetic stirrer at a number of revolutions of 300 rpm, so that a slurry liquid containing a titanium dioxide composite catalyst was obtained. FIG. 7C shows an transmission electron microscope (TEM) image of the titanium dioxide composite catalyst thus produced. For comparison, FIG. 7A shows a TEM image of the titanium dioxide particles alone, and FIG. 7B shows a TEM image of the zeolite particles alone. In the titanium dioxide composite catalyst 803, the titanium dioxide particles 801 are immobilized directly on the zeolite particles 802 without a thin film.

The water treatment system illustrated in FIG. 2 was fabricated using the thus produced slurry liquid of the titanium dioxide composite catalyst. The slurry of the titanium dioxide composite catalyst was charged into the slurry tank 202 and supplied to the photoreaction reactor 203. Aqueous solutions in which diclofenac, sulfamethoxazole (CAS No. 723-46-6), ibuprofen (CAS No. 15687-27-1) and carbamazepine, which are typical residual drugs present in water environments, were dissolved respectively were used as the waters to be treated. The substances were dissolved respectively in pure waters at an aqueous solution concentration of 1000 µg/L, and then the resulting solutions were introduced individually into the photoreaction reactor 203. The slurry liquid of the titanium dioxide composite catalyst was supplied to the photoreaction reactor so that each resulting solution had a catalyst concentration of 3.6 g/L, and then the solution was irradiated with UV light while being stirred at 200 rpm. The light source 204 was a combination of a xenon light source (MAX302 produced by Asahi Spectra Co., Ltd.) and a band-pass filter. The light had a wavelength of $\lambda=350$ nm, a bandwidth of about 10 nm, and an intensity of 1 $mW/cm^2$.

Each solution after being irradiated with the light was taken and the concentration of the substance in the solution was subjected to a quantitative analysis by HPLC/MS (6130 produced by Agilent). The ratios of the respective substances removed and decomposed were 99.95% for diclofenac, 99.95% for ibuprofen, 89.13% for sulfamethoxazole, and 94.50% for carbamazepine, with the irradiation time being 4 minutes. This indicates that the titanium dioxide composite catalyst of the present example decomposed almost all of each substance. In this way, the titanium dioxide composite catalyst was found effective in decomposing and removing the typical drugs actually observed in water environments.

The aqueous solutions that contained the suspended titanium dioxide composite catalyst and had been subjected to the photoreaction step were led to the solid-liquid separation vessel 205 and evaluated for gravitational sedimentation by a photo extinction method. An HeNe laser (632.8 nm, 3 mW, unpolarized) was used as the light source and the laser light was introduced into a fiber using a fiber coupler including an object lens, so that the solid-liquid separation vessel 205 holding the suspension was irradiated with the light. The light that had transmitted through the solid-liquid separation vessel 205 was introduced into the fiber again, and finally a photosensitive surface of a photodiode (C10439-03 produced by Hamamatsu Photonics K.K.) was irradiated with the light to measure the transmittance. The transmittance changes after the titanium dioxide composite catalyst was sedimented for 30 minutes were all in the range of 55±5% regardless of the kinds of the treated drugs. These transmittance change values exceed 20%, which is a reference for allowing the treated water to be discharged, indicating that the solid-liquid separation of the titanium dioxide composite catalyst from each aqueous solution containing the suspended titanium dioxide composite catalyst was successfully carried out by sedimentation in a short time. The titanium dioxide composite catalyst separated and recovered was led again to the photoreaction reactor 203 through the return part 206 and was able to be reused continually.

As described above, in Example 1, a water treatment method presenting excellent characteristics in terms of both photocatalytic activity and solid-liquid separation performance was achieved.

Example 2

The water treatment system to decompose and remove the drugs was fabricated by the same technique as that in Example 1. A 10 ppm aqueous solution of diclofenac as the drug to be treated was used. The supply amount of the titanium dioxide composite catalyst slurry was adjusted to prepare aqueous solutions of the titanium dioxide composite catalyst having respectively five different concentrations, and the titanium dioxide composite catalyst in each solution was evaluated for pollutant-decomposing performance and sedimentation performance. The concentration of the titanium dioxide composite catalyst was set to be 0.04 g/L for a solution A1, 0.4 g/L for a solution B1, 3.6 g/L for a solution C1, 16 g/L for a solution D1, and 40 g/L for a solution E1. The irradiation with UV light was performed under the same conditions as those in Example 1, and the ratio of the drug removed over 4 minutes was defined as pollutant-decomposing performance. Further, in the same manner as in Example 1, the aqueous solution that contained the suspended titanium dioxide composite catalyst and had been subjected to the photoreaction step was led to the solid-liquid separation vessel 205 and evaluated for light transmittance change in 30 minutes, which was defined as sedimentation performance. The solutions having the respective catalyst concentrations of 0.4 g/L, 3.6 g/L and 16 g/L had pollutant-decomposing performances of 57.8%, 57.2% and 54.3%, respectively. This indicates that these solutions exhibited high decomposing performances. However, the solutions having the respective catalyst concentrations of 0.04 g/L and 40 g/L had pollutant-decomposing performances of 8.7% and 10.3%, respectively, which are less than 1/5 of the decomposing performance of the solution with a catalyst concentration of 3.6 g/L. Therefore, in the water treatment method of this example, it was preferable that the concentration of the titanium dioxide composite catalyst was in the range of 0.4 g/L to 16 g/L.

Comparative Examples

For comparison, a catalyst in which titanium dioxide particles were immobilized on quartz beads with a binder was prepared and evaluated for pollutant-decomposing performance and sedimentation performance. Common noncrystalline silica was used as the binder. 10 g of titanium dioxide, which is P25 produced by Degussa AG, 8.7 g of TEOS (tetraethoxysilane) as silica alkoxide, 20 g of ethanol, and 50 g of a hydrochloric acid aqueous solution with a concentration of 1 mol/L were mixed together in a beaker, and the resulting mixture was cooled immediately in an ice bath while being stirred with a magnetic stirrer for 30 minutes. This mixed solution was used for evaluation within 30 minutes from the start of the stirring. The quartz beads with a particle diameter of 5 µm were immersed in this mixed solution, so that the quartz beads were coated with a photocatalyst layer. The quartz beads were taken out from the mixed solution by filtration and dried in a draft chamber for about 1 hour, and then dried again in an oven at 80° C. Through this step, a photocatalyst in which titanium dioxide particles were immobilized on the quartz beads with TEOS-derived noncrystalline silica was obtained. The state of the titanium dioxide particles immobilized on the surfaces of the quartz beads with the TEOS-derived noncrystalline silica was observed by a SEM. This photocatalyst slurry was supplied to the photoreaction reactor in the same manner and used as a comparison solution 1. The comparison solution 1 had the same titanium dioxide particles concentration as that of the solution C1 (3.6 g/L).

As a comparison solution 2, a solution in which only nanometer-order titanium dioxide particles were dispersed was tested. P25 produced by Degussa AG was used as the titanium dioxide particles, and the solution had the same titanium dioxide particles concentration as that of the solution C1 (3.6 g/L). Evaluations for pollutant-decomposing performance and sedimentation performance were made using the same drug and under the same conditions as in Example 2.

Table 2 shows pollutant-decomposing performances and sedimentation performances of the catalysts in the titanium dioxide composite catalyst solutions with the respective concentrations and the comparison solutions.

TABLE 2

| | Titanium dioxide composite catalyst solution (concentration) | | | | | Comparison solution 1 (binder process) | Comparison solution 2 (titanium dioxide particles) |
| --- | --- | --- | --- | --- | --- | --- | --- |
| | A1 (0.04 g/L) | B1 (0.4 g/L) | C1 (3.6 g/L) | D1 (16 g/L) | E1 (40 g/L) | | |
| Pollutant-decomposing performance [%/minute] | 8.7% | 57.8% | 57.2% | 54.3% | 10.3% | 7.0% | 60.1% |

TABLE 2-continued

|  | Titanium dioxide composite catalyst solution (concentration) | | | | | Comparison solution 1 (binder process) | Comparison solution 2 (titanium dioxide particles) |
| --- | --- | --- | --- | --- | --- | --- | --- |
|  | A1 (0.04 g/L) | B1 (0.4 g/L) | C1 (3.6 g/L) | D1 (16 g/L) | E1 (40 g/L) | | |
| Sedimentation performance (transmittance change) [%/minute] | 33% | 32% | 36% | 38% | 35% | 35% | 0% |

In the comparison solution 1 in which the binder was used, the catalyst had an equivalent sedimentation performance to those in the composite catalyst solutions A1 to E1 of Example 2, but had a pollutant-decomposing performance of as very low as 7.0%, which is less than ⅛ of that in the solution C1. In the comparison solution 2 that was a dispersion liquid of titanium dioxide particles, the catalyst exhibited the highest pollutant-decomposing performance of 60.1% but had a sedimentation performance of 0%, completely failing to be separated by sedimentation. In contrast, in each of the solutions B1 to D1 used in Example 2, the titanium dioxide composite catalyst was able to realize a practical water treatment because it had both of the pollutant-decomposing capability and sedimentation capability.

Example 3

The water treatment system illustrated in FIG. 4 was fabricated using the concentrated slurry liquid of the titanium dioxide composite catalyst produced in the same manner as in Example 1. The concentrated slurry of the titanium dioxide composite catalyst was charged into the slurry tank 402 and supplied to the photoreaction reactor 403. Aqueous solutions in which diclofenac, sulfamethoxazole (CAS No. 723-46-6), ibuprofen (CAS No. 15687-27-1) and carbamazepine, which are typical residual drugs present in water environments, were dissolved respectively were used as the waters to be treated. The substances were dissolved respectively in pure waters at an aqueous solution concentration of 1000 μg/L, and then the resulting solutions were introduced individually into the photoreaction reactor 403. The concentrated slurry liquid of the catalyst particles was supplied to the photoreaction reactor so that each resulting solution had a catalyst concentration of 3.6 g/L, and then the solution was irradiated with UV light while being stirred at 200 rpm. The light source 404 was a combination of a xenon light source (MAX302 produced by Asahi Spectra Co., Ltd.) and a band-pass filter. The light had a wavelength of λ=350 nm, a bandwidth of about 10 nm, and an intensity of 1 mW/cm².

Each solution after being irradiated with the light was extracted and the concentration of the substance in the solution was subjected to a quantitative analysis by HPLC/MS (6130 produced by Agilent). The ratios of the respective substances removed and decomposed were 99.95% for diclofenac, 99.95% for ibuprofen, 89.13% for sulfamethoxazole, and 94.50% for carbamazepine, with the irradiation time being 4 minutes. This indicates that the photocatalyst decomposed almost all of each substance. In this way, the titanium dioxide composite catalyst was found effective in decomposing and removing the typical drugs actually observed in water environments.

The suspension subjected to the photoreaction step were led to the solid-liquid separation vessel 405 and evaluated for gravitational sedimentation by a photo extinction method and for separation by microfiltration. An HeNe laser (632.8 nm, 3 mW, unpolarized) was used as the light source for the photo extinction method and the laser light was introduced into a fiber using a fiber coupler including an object lens, so that the solid-liquid separation vessel holding the suspension was irradiated with the light. The light that had transmitted through the solid-liquid separation vessel 405 was introduced into the fiber again, and finally a photosensitive surface of a photodiode (C10439-03 produced by Hamamatsu Photonics K.K.) was irradiated with the light to measure the transmittance, and the sedimentation amount was calculated from the transmittance. The sedimentation amounts over 30 minutes were all in the range of 92±5% regardless of the kinds of the treated drugs. These values exceed 80%, which is a reference for solid-liquid separation of the catalyst particles, indicating that the solid-liquid separation of each suspension was successfully carried out by sedimentation in a short time.

As the filtration membrane for microfiltration, a filter paper that is made of a resin and has an average pore diameter of 0.42 μm was used. Monitoring the output flow rate of each treated water in the microfiltration, it was about 100 mL/min and stable over 24 hours. The concentration of the catalyst remaining in the treated water was 10 ppm or less. In contrast, in the case where the titanium dioxide particles were used, the flow rate, which had been 100 mL/min at the beginning, fell to 1.2 mL/min in 8 hours. That is, the filtration membrane was clogged.

As described above, in Example 3, a water treatment method presenting excellent characteristics in terms of both photocatalytic activity and solid-liquid separation performance was achieved by using the titanium dioxide composite catalyst.

Example 4

The water treatment system to decompose and remove the drugs was fabricated by the same technique as that in Example 1. A 10 ppm aqueous solution of diclofenac as the drug to be treated was used. The supply amount of the concentrated slurry of the titanium dioxide composite catalyst was adjusted to prepare aqueous solutions of the titanium dioxide composite catalyst having respectively five different concentrations, and the titanium dioxide composite catalyst in each solution was evaluated for pollutant-removing ratio, sedimentation amount, and extraction flow rate of the treated water. The concentration of the titanium dioxide composite catalyst was set to be 0.04 g/L for a solution A2, 0.4 g/L for a solution B2, 3.6 g/L for a solution C2, 16 g/L for a solution D2, and 40 g/L for a solution E2. The irradiation with UV light was performed under the same conditions as those in Example 3, and the ratio of the drug removed over 4 minutes was defined as pollutant-decomposing performance. Further, in the same manner as in Example 1, the suspension subjected to the photodecomposition treatment was led to the solid-liquid separation vessel and evaluated for sedimentation amount and extraction flow rate of the treated water in 30 minutes. The solutions having the respective titanium dioxide composite catalyst concentrations of 0.4 g/L, 3.6 g/L and 16 g/L had pollutant-removing ratios of 57.8%, 57.2% and 54.3%, respectively. This indicates that these solutions exhibited high decomposing performances. However, the solutions having the respective catalyst concentrations of 0.04 g/L and 40 g/L had pollutant-decomposing performances of 8.7% and 10.3%, respectively, which are less than 1/5 of the pollutant-decomposing performance of the solution with a catalyst concentration of 3.6 g/L. Therefore, in the water treatment method of this example, it was preferable that the solution had a catalyst concentration of 0.4 g/L or more and 16 g/L or less.

Comparative Examples

In the same manner as the comparison solution 1, a photocatalyst in which titanium dioxide particles were immobilized on quartz beads with TEOS-derived noncrystalline silica was obtained. The state of the titanium dioxide particles immobilized on the surfaces of the quartz beads with the TEOS-derived noncrystalline silica was observed by a SEM. This concentrated photocatalyst slurry was supplied to the photoreaction reactor in the same manner as in Example 4 and used as a comparison solution 3. The comparison solution 3 had the same titanium dioxide particles concentration as that of the solution C2 (3.6 g/L).

A solution in which only nanometer-order titanium dioxide particles were dispersed was tested in the same manner as in Example 4. P25 produced by Degussa AG was used as the titanium dioxide particles, and the solution had the same titanium dioxide particles concentration as that of the solution C2 (3.6 g/L). Evaluations for pollutant-removing ratio, sedimentation amount, and extraction flow rate of the treated water were made using the same drug and under the same conditions as in Example 4.

Table 3 shows the results of the catalyst particles solutions with the respective concentrations and the comparison solutions. In the comparison solution 3 in which the binder was used, the sedimentation amount and the extraction flow rate were equivalent to those in the catalyst particles solutions A2 to E2 of Example 4, but the pollutant-decomposing performance was as very low as 7.0%, which is less than 1/8 of that in the solution C2. In the comparison solution 4 that was a dispersion liquid of titanium dioxide particles, the catalyst exhibited the highest pollutant-decomposing performance of 60.1% but had a sedimentation performance of 0%, completely failing to be separated by sedimentation. Also, the extraction flow rate was 0 mL/min, failing to separate the treated water. In contrast, in each of the solutions B2 to D2 used in Example 4, the pollutant-decomposing performance, the sedimentation amount and the extraction flow rate were all satisfactory, indicating that a practical water treatment was able to be performed.

TABLE 3

|  | Titanium dioxide composite catalyst solution (concentration) | | | | | Comparison solution 3 (binder process) | Comparison solution 4 (titanium dioxide particles) |
| --- | --- | --- | --- | --- | --- | --- | --- |
|  | A2 (0.04 g/L) | B2 (0.4 g/L) | C2 (3.6 g/L) | D2 (16 g/L) | E2 (40 g/L) | | |
| Pollutant-decomposing performance [%/4 minutes] | 8.7% | 57.8% | 57.2% | 54.3% | 10.3% | 7.0% | 60.1% |
| Sedimentation amount [%/30 minutes] | 81.0% | 82.6% | 85.9% | 88.5% | 89.3% | 89.0% | 0% |
| Extraction flow rate [ml/minute] | 110 | 100 | 105 | 110 | 100 | 90 | 0 |

INDUSTRIAL APPLICABILITY

The present invention can provide a method and a system that can treat water in practical time continuously for decomposing and removing drugs that are organic compounds contained in sewage and service water and in water environments such as inland rivers or lakes. It is possible to equip ordinary homes, hospitals, etc. with the present invention as a waste water treatment facility. The present invention can also be used as one step in the sewage treatment process in a sewage treatment plant.

What is claimed is:

1. A method for decomposing at least one of organic compound contained in an aqueous solution, comprising:
    a step a of adding catalyst particles into the aqueous solution;
    a step b of decomposing the organic compound by irradiating the aqueous solution with light having a wavelength of 200 nanometers or more and 400 nanometers or less while stirring the catalyst particles in the aqueous solution; and
    a step c of stopping the stirring in the step b, and separating the catalyst particles from the aqueous solution by sedimentation,
    wherein the catalyst particles are composed only of titanium dioxide particles and zeolite particles, the titanium dioxide particles are adsorbed on outer surfaces of the zeolite particles, the zeolite particles have a silica/alumina molar ratio of 10 or more, and the catalyst particles are contained in the aqueous solution at a concentration of 0.4 grams/liter or more and 16 grams/liter or less.

2. The method according to claim 1, comprising a step d of adding again the catalyst particles separated by sedimentation in the step c into the aqueous solution after the step c,
    wherein the step b and the step c are performed again after the step d.

3. The method according to claim 1,
    wherein the catalyst particles are separated by sedimentation in a solid-liquid separation vessel having a filtration membrane in the step c,
    the method further comprises a step e of producing treated water from the aqueous solution using the filtration membrane, and
    in the step e, the filtration membrane is a filtration membrane obtained by adhering a filter paper made of a resin to each of both sides of a plate-like frame, and the filtration membrane is arranged parallel to a direction in which the catalyst particles sediment.

4. The method according to claim 3, comprising a step f of adding again the catalyst particles separated by sedimentation in the step c into the aqueous solution after the step c,
    wherein the step b, the step c and the step e are performed again after the step f.

5. The method according to claim 1, wherein the zeolite particles are zeolite particles treated with an acid aqueous solution to dissolve alumina portions thereof to introduce active sites for adsorbing the titanium dioxide particles directly on the zeolite particles, and then washed with water to remove the acid aqueous solution adhered to surfaces of the zeolite particles.

* * * * *